(12) United States Patent
Feichtinger

(10) Patent No.: US 8,047,393 B2
(45) Date of Patent: Nov. 1, 2011

(54) TANK FILLER NECK WITH A NEGATIVE AND POSITIVE PRESSURE RELIEF VALVE

(75) Inventor: Stefan Feichtinger, Büchl (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 918 days.

(21) Appl. No.: 11/953,909

(22) Filed: Dec. 11, 2007

(65) Prior Publication Data

US 2009/0001077 A1 Jan. 1, 2009

(30) Foreign Application Priority Data

Dec. 11, 2006 (AT) .................... GM860/2006

(51) Int. Cl.
*B65D 51/16* (2006.01)
(52) U.S. Cl. ...... 220/86.2; 220/86.1; 220/203; 220/367; 220/913; 220/DIG. 33
(58) Field of Classification Search .......... 220/86.1, 220/86.2, 203, 367, 913, DIG. 33
See application file for complete search history.

(56) References Cited

U.S. PATENT DOCUMENTS

| 3,880,317 | A | | 4/1975 | Arnett | |
|---|---|---|---|---|---|
| 5,071,018 | A | * | 12/1991 | Moore | 220/86.2 |
| 6,056,140 | A | | 5/2000 | Muth et al. | |
| 6,415,827 | B1 | * | 7/2002 | Harris et al. | 141/348 |
| 6,481,592 | B2 | | 11/2002 | Harris | |
| 6,755,057 | B2 | * | 6/2004 | Foltz | 70/159 |
| 2003/0056837 | A1 | | 3/2003 | Benjey | |

FOREIGN PATENT DOCUMENTS

DE 202006000939 3/2006

* cited by examiner

*Primary Examiner* — Anthony Stashick
*Assistant Examiner* — Elizabeth Volz
(74) *Attorney, Agent, or Firm* — Bachman & LaPointe, P.C.

(57) ABSTRACT

A tank filler neck comprises an outer wall (1), an inner wall (2) and an inner space (19) closed off from the environment during operation. In order to enable the pressure in this space (19) to be equalized in both directions, a negative and positive pressure relief valve (20) is provided in the annular space (18) between outer wall (1) and inner wall (2). The valve comprises a partition (21) with holes (30) distributed over the circumference, said partition dividing the annular space (18) between outer wall (1) and inner wall (2) into a first annular space (22) connected to the atmosphere and a second annular space (23) connected to the inner space (19), a first valve ring (31) in the first annular space (22) and a second valve ring (32) in the second annular space (23), which valve rings have first zones (40, 42) and second offset zones (41, 43) alternating in the circumferential direction, see FIG. 4.

6 Claims, 3 Drawing Sheets

TANK FILLER NECK WITH A NEGATIVE AND POSITIVE PRESSURE RELIEF VALVE

BACKGROUND OF THE INVENTION

The invention relates to a tank filler neck which has an outer wall and an inner wall and, in its interior, forms a space which is closed in relation to the environment during operation and is opened for refueling, wherein a negative and positive pressure relief valve is provided for equalizing the pressure when the space is closed. The tank filler neck may be closed both by means of a screw cap or bayonet cap or may be of the capless type.

In the first case, it can be formed without any inner flaps because the space is closed by the screw or bayonet cap. In the second case, it is equipped at its upper end with a flap which can be pushed open inward by the filling pipe of a fuel nozzle. A further flap—a "lead free flap" can be arranged further inward. The closed space formed in the tank filler neck merges into the interior of the tank and therefore the same pressure as in the tank prevails in it. This pressure fluctuates. When the tank is heated, a positive pressure is produced therein and therefore in the space. When the tank content is cooled and because of the removal of fuel, a negative pressure, which is also undesirable, forms in the tank.

It is therefore known to install a negative and positive pressure relief valve in the cap (for example screw cap) closing off the tank filler neck to the outside in conventional tank systems. Tank caps of this type are described in AT patent 403 144 and DE 102 16 811 A1. They make the tank cap (which is easily lost) expensive and also bulky. In the case of capless tank filler necks, valves of this type are not feasible because the passage of the filling pipe of a fuel nozzle has to be ensured. An inwardly opening flap may be provided in the case of capless tank filler necks. However, when there is positive pressure in the tank, said flap is pressed even more firmly against its seat and, because of the considerable force of its closing spring, cannot equalize a negative pressure in the tank. The fitting of a valve into the flap is out of the question because the flap is pushed open by the filling pipe of the fuel nozzle.

It is therefore the object of the invention to enable an equalization of the pressure in both directions by means of a solution which is as simple and space-saving as possible. The tank cap is to be as simple and inexpensive as possible or entirely superfluous. Equalization of pressure is therefore to be ensured even in the case of capless tank filler necks.

SUMMARY OF THE INVENTION

According to the invention, the negative and positive pressure relief valve is arranged in the annular space formed between the outer wall and the inner wall, which valve is firstly connected to the space and secondly to the atmosphere and opens in the one or other direction in order to reduce a pressure differential between the space and the atmosphere. Irrespective of the structural design and of the selection of material, an annular space is virtually always free between inner wall and outer wall. Said space is used for the accommodation of the negative and positive pressure relief valve without the outside diameter of the tank filler neck becoming larger as a result. This means that either the tank cap can be quite simple or, in the case of a capless type, the introduction of the filling pipe and the function of a flap are not obstructed.

In one advantageous development, the negative and positive pressure relief valve comprises a partition which is located in a plane normal to the axis and has axial openings distributed over the circumference, said partition dividing the annular space between the outer wall and inner wall into a first, upper annular space connected to the atmosphere and into a second, lower annular space connected to the inner space, and furthermore comprises a first valve ring in the first annular space, which valve ring is loaded against the partition by a first valve spring, and furthermore again comprises a second valve ring in the second annular space, which valve ring is loaded against the other side of the partition by a second valve spring. The axial openings in the partition are distributed over the circumference, and are preferably circular holes, on both sides of which a respective valve ring is arranged. Irrespective of their configuration, the valve rings are parts which are simple in detail and are structurally identical, and there is also sufficient space in the two spaces for a spiral spring running all the way around, or for a plurality of cylinder springs, disk springs or an undulated spring.

A particularly elegant development involves the two valve rings each having first and second zones alternating in the circumferential direction, the first zone bearing against the partition under loading by the spring and the second zone being offset in the axial direction such that it does not rest on the partition, and also involves a first zone of the first valve ring on one side of the partition having a second zone of the second valve ring on the other side of the partition lying opposite it. Owing to the fact that a first zone of the valve ring present on one side of the partition always has an offset second zone (which, because of the smaller axial height of the valve ring there, does not close the holes) opposite it, adjacent zones are available in an alternating manner for the one or other throughflow direction. In order to ensure this assignment of the zones, the simplest method is to guide the valve rings in the axial direction so as to secure them against rotation.

The arrangement of the negative and positive pressure relief valve in the annular space gives freedom in the selection of its height, and therefore no flow ducts are required. The first annular space is therefore advantageously connected to the atmosphere via first openings in the outer wall of the tank filler neck and the second annular space is connected to the inner space via second openings in the inner wall of the tank filler neck.

If there is a flap in the interior of the tank filler neck, a preferred embodiment of the invention involves the negative and positive pressure relief valve being arranged in the annular space at a higher point than the flap. This ensures that, even during very rapid refueling, fuel does not pass to the outside.

BRIEF DESCRIPTION OF THE DRAWINGS

The invention is described and explained below with reference to figures of a possible embodiment. In the figures.

DETAILED DESCRIPTION

Figure 1:
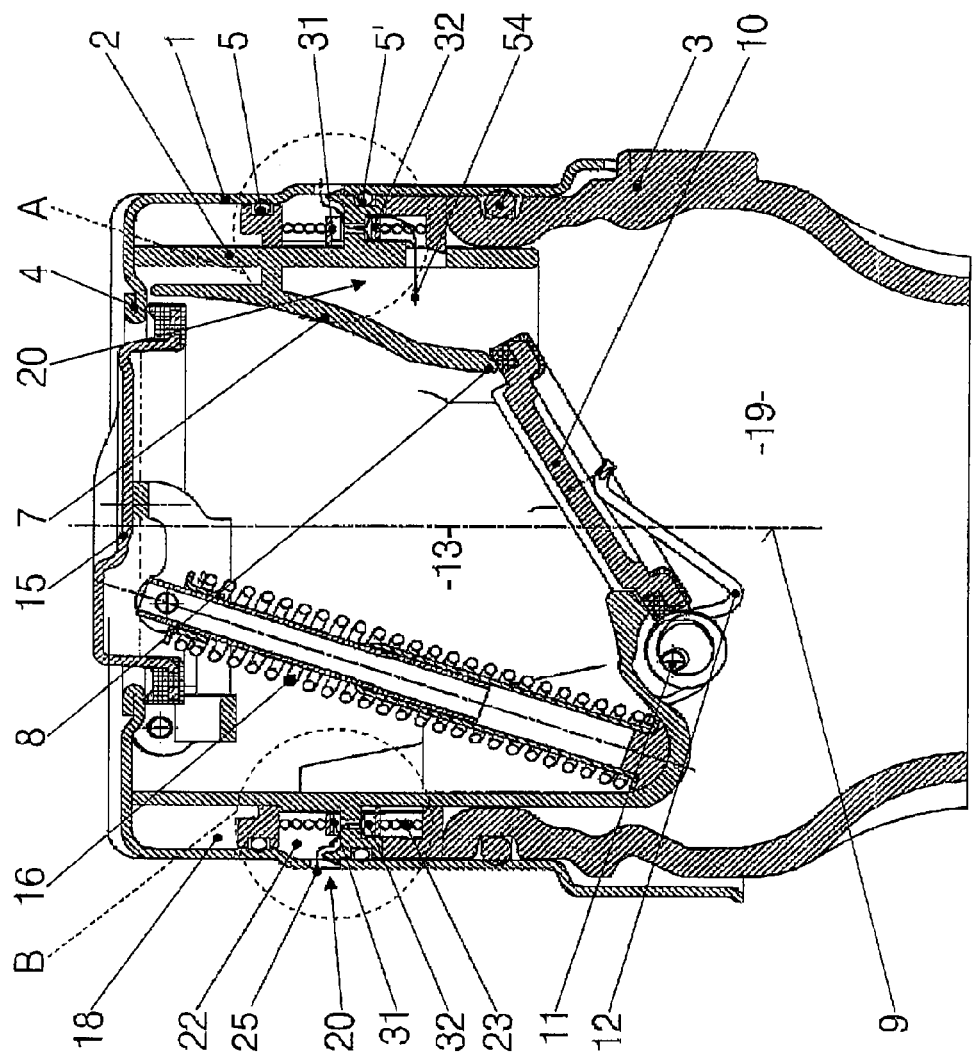
FIG. 1: shows a tank filler neck according to the invention in longitudinal section.

In FIG. 1, the outer wall of a tank filler neck 1 is referred to by 1, its inner wall by 2 and a pipe part which is connected to both and leads to a fuel tank (not illustrated) by 3. The outer wall 1 here is composed of sheet metal and ends at the top in a flange 4 running all the way around. The inner wall 2 is a plastic injection molded part which is sealed off in relation to the outer wall 1 by means of O-rings 5, 5' and, on one side, forms a guide wall 7 which tapers inward. In the exemplary embodiment shown, said guide wall ends in a passage opening 8 for the filling pipe of a fuel nozzle (not illustrated) which is closed by a flap 10. The flap can be pivoted inward about a spindle 11, which is fastened to the inner wall 2, counter to the force of a leg spring 12. The longitudinal axis of the tank filler neck, which is essentially circular in cross section, is referred to by 9.

The flap 10 separates a preliminary space 13, which is located above it, from a space 19 which is located below it, downstream, and is connected directly to the fuel tank via the pipe part 3. The same pressure as in the fuel tank therefore prevails in the space 19, said pressure being dependent on various influences and therefore being variable. The preliminary space 13 above the flap 10 is also closed here by a further flap 15 loaded by a compression spring 16. This further flap 15 is also pushed open by the filling pipe of the fuel nozzle during refueling. The flap has been described for the sake of completeness, but the invention is also suitable for embodiments without a flap.

The annular space 18 between outer wall 1 and inner wall 2 is separated by a partition 21 in a first annular space 22 and a second annular space 23 located below it. A negative and positive pressure relief valve, referred to in total by 20, is provided between the two annular spaces 22, 23 and serves to equalize the pressure between the space 19 and the atmosphere outside the outer wall 1. Since the pressure in the space 19 can be either greater or less than the atmospheric pressure, the negative and positive pressure relief valve 20 has to release the flow sometimes in the one direction and sometimes in the other direction depending on the sign of the pressure gradient.

The negative and positive pressure relief valve 20 is now described with reference to FIGS. 2a, 3 and 4. The first annular space 22 is connected to the atmosphere via first openings 25 in the outer wall 1, and the second annular space 23 is connected to the space 19 via second openings 26. The two annular spaces 22, 23 are separated from each other by the partition 21 which, distributed over its circumference, has holes which are parallel to the longitudinal axis 9 and are distributed uniformly over the circumference. A circular ring-shaped valve ring acts on both sides of said holes, to be precise, a first valve ring 31 acts on the upper side and a second valve ring 32 acts on the lower side. The two valve rings 31, 32 are loaded in the closing direction toward the partition 21 by a respective spiral spring 33, 34 running all the way around (or one or more springs of a different type). The valve springs 33, 34 are supported at their ends facing away from the valve rings 31, 32 on corresponding surfaces 35, 36 of the inner wall 2.

Figure 3:
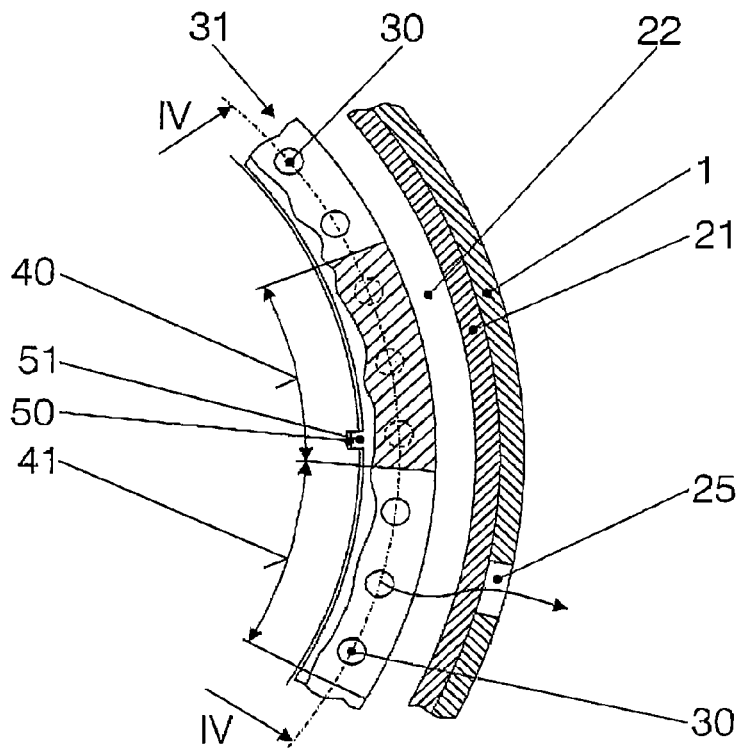
FIG. 3: shows a section according to III-III in FIG. 2*a*, FIG. 4: shows an uncoiled section according to IV-IV in FIG. 3.
Figure 4:
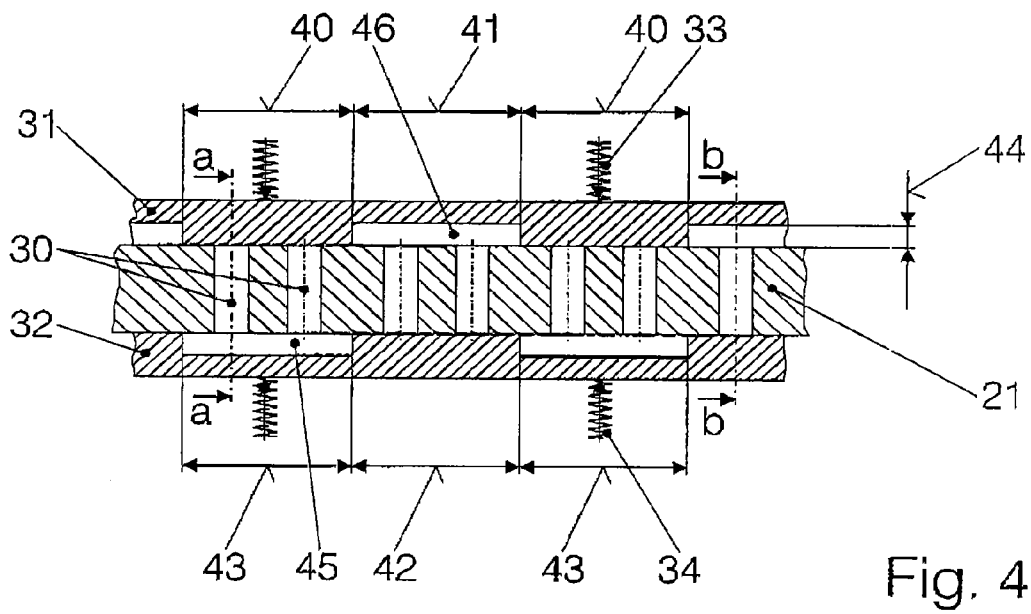

The special design of the valve rings 31, 32 can be seen when looking at FIG. 3 and FIG. 4. Said (circular ring-shaped) rings are flat on their side which faces away from the partition 21 but are divided on their side which faces the partition 21 into zones 40, 41, 42, 43 which alternate with one another, with the zones 41, 43 forming an offset 44 and therefore, when the valve ring 31, 32 is present, not covering the holes assigned to them but rather forming passageways 45, 46 of a certain height (44 in FIG. 4). A zone is preferably assigned a plurality of holes 30. The offsets 44 are recesses, in particular milled portions, over the entire radial width of the valve rings 31, 32, and they therefore produce the connection between the holes 30 assigned to them and the respective annular space 22 or 23. The first valve ring 31 has the zones 40, 41 in an alternating manner (see FIGS. 3 and 4), and the second valve ring 32 has the zones 42, 43 in an alternating manner. In this case, the two valve rings 31, 32 are arranged with respect to each other in such a manner that a first zone 40 which is present of the first valve ring 31 on the other side of the partition 21 is assigned an offset, second zone 43 of the second valve ring 32. So that the two valve rings 31, 32 maintain their assignment, they are both secured against rotation. In FIG. 3, this is illustrated for the first valve ring 31 as a lug 51 which engages in a vertical groove 50 of the inner wall 2.

Figure 2:
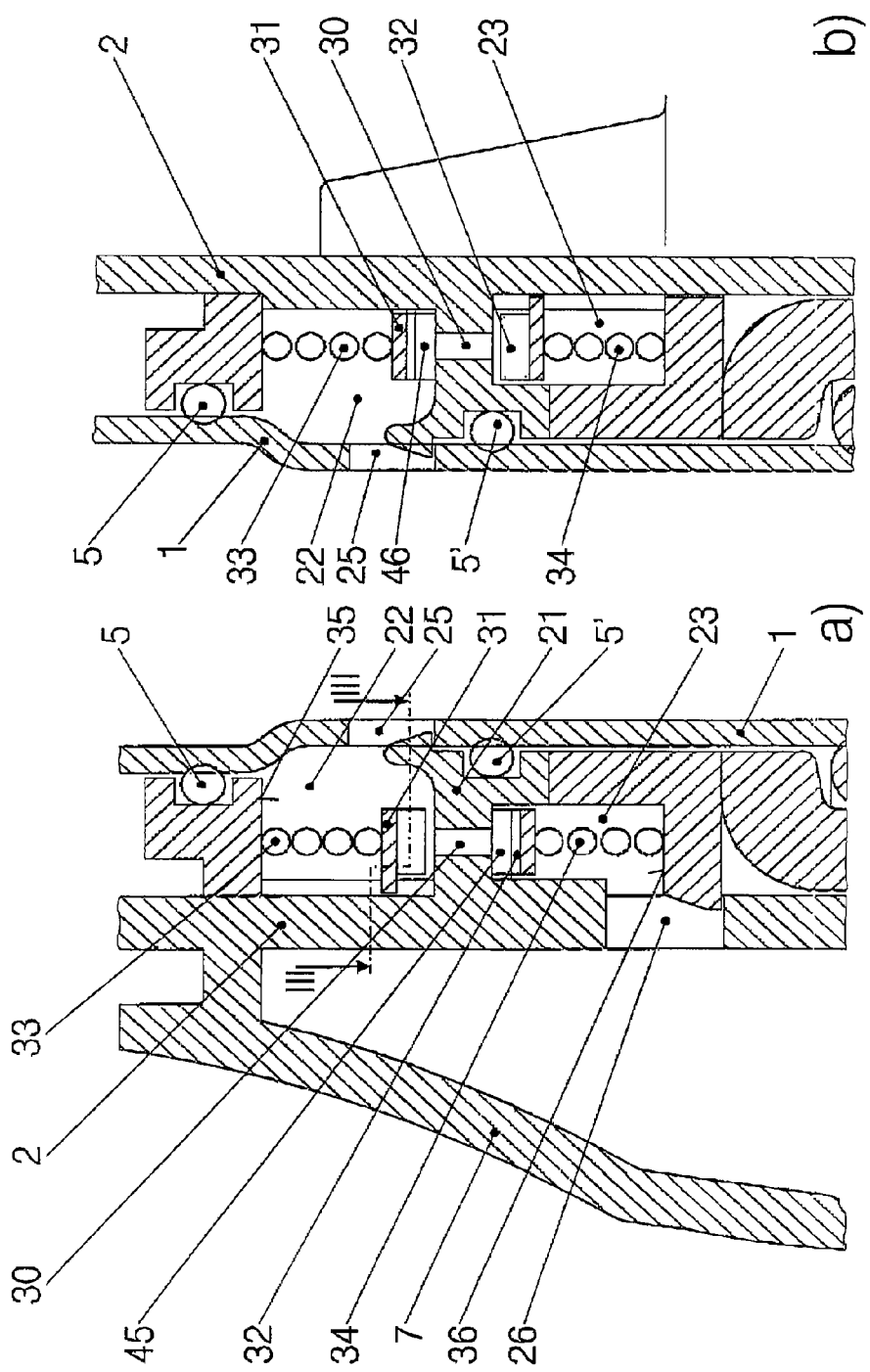
FIG. 2: shows details A (FIG. 2*a*) and B (FIG. 2*b*) in FIG. 1, on an enlarged scale.

FIG. 4 shows the section lines a-a and b-b to which the enlarged sections of FIG. 2a and FIG. 2b are assigned. Accordingly, the lower transverse passageway 45 formed by the offset can be seen in FIG. 2a and the transverse passageway 46 formed in the first valve ring 31 can be seen in FIG. 2b. The offset 44 is also shown in FIG. 4.

The function of the negative and positive pressure relief valve 20 is described with reference to FIG. 1: in the right half of FIG. 1, the valve 20 acts as a positive pressure relief valve. The flow is illustrated by the continuous line 54. The pressurized air and fuel vapor mixture from the space 19 flows through the opening(s) (see FIG. 2a) into the second annular space 23, laterally past the second valve ring 32 into the transverse passageways 45 and on into the holes 30 assigned thereto. The pressure in the holes 30 raises the first valve ring 31 such that the latter releases the flow into the first annular space 22, from which the fuel and air mixture flowing off enters into the open through the first opening 25.

In the left half of FIG. 1, a negative pressure prevails in the space 19. Air from the atmosphere flows through the opening 25 into the first annular space 22, and through the transverse passageways 46 (see FIG. 4) into the assigned holes 30. The positive pressure in them presses the second valve ring 32 downward such that the assigned holes 30 are open toward the second annular space 23. The latter (23) is connected to the space 19 via the second openings 26. The equalization of pressure in both directions is therefore ensured.

The invention claimed is:

1. Tank filler neck comprises an outer wall (1) and a concentric and cylindric inner wall (2) and, in its interior, forms a space (19) which is closed in relation to the environment during operation and is opened for refueling, wherein a single combined valve which acts as a negative and positive pressure relief valve is provided for equalizing the pressure when the space (19) is closed, the single combined negative and positive pressure relief valve (20) is arranged in an annular space (18) formed between the outer wall (1) and the inner wall (2) and the single combined valve surrounds the entire inner wall, which single combined valve (20) is firstly connected to the space (19) and secondly to the atmosphere and opens in the one or other direction in order to reduce a pressure differential between the space (19) and the atmosphere.

2. Tank filler neck according to claim 1, wherein, in its interior, a flap (10) which seals off a preliminary space (13) is provided, the flap (10) is bounded by a guide wall (7), in relation to the space (19) lying downstream and can be pushed open by a fuel nozzle counter to the force of a flap spring (12), wherein the negative and positive pressure relief valve (20) is arranged in the annular space (18) at a higher point than the flap (10).

3. Tank filler neck according to claim 1, wherein the single combined negative and positive pressure relief valve (20) comprises:
 a) a partition (21) which is located in a plane normal to an axis and has holes (30) distributed over all the circumference, said partition dividing the annular space (18) between outer wall (1) and inner wall (2) into a first annular space (22) connected to the atmosphere and a second annular space (23) connected to the inner space (19);

b) a first valve ring (31) in the first annular space (22), which valve ring is loaded against the partition (21) by a first valve spring (33); and c) a second valve ring (32) in the second annular space (23), which valve ring is loaded against the other side of the partition (21) by a second valve spring (34).

4. Tank filler neck according to claim 3, wherein the two valve rings (31, 32) each have first zones (40, 42) and second zones (41, 43) alternating in the circumferential direction, the first zones (40, 42) bearing against the partition (21) under loading by the valve springs (33, 34) and the second zones (42, 44) having an offset (44) in the axial direction such that they do not rest on the partition (21), and in that a first zone (40) of the first valve ring (31) on one side of the partition (21) has a second zone (43) of the second valve ring (32) on the other side of the partition (21) lying opposite it.

5. Tank filler neck according to claim 4, wherein the valve rings (31, 32) have an axial guide (50, 51) as a means of securing them against rotation.

6. Tank filler neck according to claim 3, wherein the first annular space (22) is connected to the atmosphere via first openings (25) in the outer wall (1) of the tank filler neck and the second annular space (23) is connected to the inner space (19) via second openings (26) in the inner wall (2) of the tank filler neck.

* * * * *